(12) United States Patent
Lall et al.

(10) Patent No.: US 12,099,804 B2
(45) Date of Patent: Sep. 24, 2024

(54) DEFINITION RETRIEVAL AND DISPLAY

(71) Applicant: Spectacles LLC, Lewes, DE (US)

(72) Inventors: Naresh Lall, Lewes, DE (US); William DeCotiis, Lewes, DE (US)

(73) Assignee: Spectacles LLC, Lewes, DE (US)

( * ) Notice: Subject to any disclaimer, the term of this patent is extended or adjusted under 35 U.S.C. 154(b) by 0 days.

(21) Appl. No.: 17/734,964

(22) Filed: May 2, 2022

(65) Prior Publication Data

US 2022/0374596 A1 Nov. 24, 2022

Related U.S. Application Data

(63) Continuation of application No. 16/932,498, filed on Jul. 17, 2020, now Pat. No. 11,354,501.

(Continued)

(51) Int. Cl.
*G06F 40/242* (2020.01)
*G06F 9/54* (2006.01)
(Continued)

(52) U.S. Cl.
CPC ............ *G06F 40/242* (2020.01); *G06F 9/541* (2013.01); *G06F 16/284* (2019.01);
(Continued)

(58) Field of Classification Search
CPC .... G06F 40/205; G06F 40/242; G06F 40/279; G06F 9/541; G06F 16/284; G06N 3/0454;
(Continued)

(56) References Cited

U.S. PATENT DOCUMENTS 5,029,085 A * 7/1991 Ito .......................... G10L 15/193
704/E15.022
5,649,221 A * 7/1997 Crawford .............. G06F 16/374
704/10

(Continued)

FOREIGN PATENT DOCUMENTS

CA         2747145 A1    1/2013
KR    10-2015-0082754    *  7/2015

OTHER PUBLICATIONS

Classification Definitions Class 715, Data Processing: Presentation Processing of Document, Operator Interface Processing, and Screen Saver Display Processing; Feb. 2011; pp. 1-33.*

(Continued)

*Primary Examiner* — Maikhanh Nguyen
(74) *Attorney, Agent, or Firm* — Pillsbury Winthrop Shaw Pittman, LLP

(57) ABSTRACT

Provided is a method including obtaining a first text of a natural language text document displayed by the application, detecting a definitional statement in the first text, and parsing a defined term and a definition of the defined term from the definitional statement. The method also includes storing the defined term and the definition in an entry in a dictionary data structure and associating the entry with a location in the text document. The method also includes detecting the defined term being used in another location in the document and, in response, causing a visual indication to be presented in a first region in association with the defined term being used in the other location. The method may include causing the definitional statement or definition thereof to be displayed in a second region concurrently with displaying the defined term and the visual indication in the first region.

31 Claims, 6 Drawing Sheets

Related U.S. Application Data

(60) Provisional application No. 62/882,197, filed on Aug. 2, 2019.

(51) Int. Cl.
*G06F 16/28* (2019.01)
*G06F 40/205* (2020.01)
*G06F 40/279* (2020.01)
*G06N 3/045* (2023.01)

(52) U.S. Cl.
CPC .......... *G06F 40/205* (2020.01); *G06F 40/279* (2020.01); *G06N 3/045* (2023.01)

(58) Field of Classification Search
CPC ........ G06N 3/0445; G06N 3/08; G06N 7/005; G06N 5/003
USPC ........................................................ 715/259
See application file for complete search history.

(56) References Cited

U.S. PATENT DOCUMENTS

| | | | |
|---|---|---|---|
| 6,275,789 B1* | 8/2001 | Moser | G06F 40/211 704/7 |
| 7,765,471 B2* | 7/2010 | Walker | G06F 40/103 715/245 |
| 7,869,989 B1* | 1/2011 | Harvey | G06F 40/242 704/8 |
| 7,945,527 B2* | 5/2011 | Michelin | G06F 40/30 706/62 |
| 8,229,733 B2* | 7/2012 | Harney | G06F 40/205 704/235 |
| 8,805,095 B2* | 8/2014 | Boegelund | G06F 40/232 382/229 |
| 9,081,410 B2* | 7/2015 | Matas | G06F 3/04847 |
| 9,116,654 B1* | 8/2015 | Shah | G06F 3/147 |
| 9,342,233 B1* | 5/2016 | Dimson | G06F 40/242 |
| 9,852,124 B2* | 12/2017 | Allen | G06F 40/268 |
| 10,176,890 B2* | 1/2019 | Alba | G06F 40/166 |
| 10,275,446 B2* | 4/2019 | Allen | G06F 16/382 |
| 10,380,226 B1* | 8/2019 | Tseng | G06F 40/106 |
| 10,515,138 B2* | 12/2019 | Walker | G06F 40/253 |
| 10,565,445 B1* | 2/2020 | Walters | G06V 30/418 |
| 10,713,443 B1* | 7/2020 | Knight | G06F 40/289 |
| 2003/0126106 A1* | 7/2003 | Coen | G06F 40/242 707/E17.093 |
| 2006/0282778 A1* | 12/2006 | Barsness | G06F 16/34 715/726 |
| 2009/0055394 A1* | 2/2009 | Schilit | G06F 16/3344 |
| 2010/0010804 A1* | 1/2010 | Friedman | G16B 40/00 704/9 |
| 2010/0063799 A1 | 3/2010 | Jamieson | |
| 2010/0145678 A1* | 6/2010 | Csomai | G06F 40/169 704/10 |
| 2011/0261030 A1* | 10/2011 | Bullock | G06F 3/0488 345/204 |
| 2012/0079372 A1* | 3/2012 | Kandekar | G06F 40/258 715/256 |
| 2012/0254802 A1* | 10/2012 | Tinkler | G06F 16/36 715/830 |
| 2012/0324350 A1* | 12/2012 | Rosenblum | G06F 40/131 715/256 |
| 2013/0080881 A1* | 3/2013 | Goodspeed | G06F 40/10 715/251 |
| 2013/0124988 A1* | 5/2013 | Lettau | G06F 40/103 715/277 |
| 2013/0144878 A1* | 6/2013 | James | G06F 16/907 707/E17.058 |
| 2013/0151954 A1* | 6/2013 | Ierullo | G06F 3/04842 715/254 |
| 2014/0075004 A1* | 3/2014 | Van Dusen | G06Q 50/01 709/223 |
| 2015/0309989 A1* | 10/2015 | Brav | G06F 40/284 704/9 |
| 2016/0350886 A1* | 12/2016 | Jessen | G06Q 50/184 |
| 2017/0075877 A1* | 3/2017 | Lepeltier | G06F 40/117 |
| 2017/0097987 A1* | 4/2017 | Bao | G06F 16/338 |
| 2017/0220360 A1* | 8/2017 | Chiba | G06F 9/453 |
| 2018/0046331 A1* | 2/2018 | Monson | G06F 40/109 |
| 2018/0268506 A1* | 9/2018 | Wodetzki | G06N 5/046 |
| 2018/0330000 A1* | 11/2018 | Noble | G09B 7/02 |
| 2019/0005029 A1* | 1/2019 | Mills | G06F 40/30 |
| 2019/0005198 A1* | 1/2019 | Richards | G06Q 10/10 |
| 2020/0042596 A1* | 2/2020 | Ravi | G06N 3/063 |
| 2020/0090641 A1* | 3/2020 | Kim | H04L 51/02 |
| 2020/0342470 A1* | 10/2020 | Morningstar | G06Q 10/067 |
| 2021/0006861 A1* | 1/2021 | Manning | H04N 21/4882 |
| 2021/0019375 A1* | 1/2021 | Croutwater | G06F 16/3344 |
| 2021/0042586 A1* | 2/2021 | Toyoshiba | G06F 17/18 |

OTHER PUBLICATIONS

Alammar, Jay, "Visualizing Machine Learning One Concept at a Time," The Illustrated Transformer, http://jalammar.github.io/illustrated-transformer, Jun. 17, 2018 (23 pages).*

Mane, V, 2017 "Comparative analysis of different word embedding models," International Conference on Advances in Computing, Communication and Control (ICAC3) Dec. 2017, (pp. 1-4). IEEE.*

Peters et al., "Deep contextualized word representations," arXiv:1810.04805v2 [cs.CL] Mar. 22, 2018 (15 pages).*

Kakkonen et al., "Comparison of dimension reduction methods for automated essay grading," 2008 Journal of Educational Technology & Society, 11(3), pp. 275-288.*

Vaswani et al., "Attention is All You Need," Dec. 6, 2017 arXiv:1706.03762v5 [cs.CL] (15 pages).*

International Search Report and Written Opinion in related International Application No. PCT/US2020/042826 dated Oct. 27, 2020 (10 pages).*

Ambrogi, Bob, "Litera Acquires AI—Powered Contract Drafting Platform Bestpractix," LawSites Blog Jun. 16, 2020 https://www.lawsitesblog.com/2020/06/litera-acquires-ai-powered-contract drafting-platform-bestpractix.html, 4 pages.*

Devlin et al., "BERT: Pre-training of deep bidirectional transformers for language understanding," May 24, 2019 arXiv:1810.04805, 16 pages.*

"Montionize Promotion" screen capture of Joshua Schoen LinkedIn post, LinkedIn, accessed on Dec. 14, 2021, p. 1.*

"IBM to Add New Natural Language Processing Enhancements to Watson Discovery," IBM Nov. 10, 2021 https://newsroom.ibm.com/2021-11-10-IBM-to-Add-New-Natural-Language-Processing-Enhancements-to-Watson-Discovery?social_post=5899548327&linkId=139601053, pp. 1-6.*

Web archive of "Drafting made simple," Define captured Dec. 24, 2019 of http://trydefine.com/ at http://web.archive.org/web/20191224204614/trydefine.com/, pp. 1-6.*

Web archive of "Donna is an AI assistant that helps lawyers be productive and happy," Donna Legal captured Jul. 7, 2019 of https://www.donna.legal at http://web.archive.org/web/20190707104449/https://www.donna.legal/, pp. 19.*

Web archive of "Drafts Contracts With Confidence.," Donna captured Jul. 16, 2020 of https: www.donna.legal/ at http://web.archive.org/web/20190707104449/https://www.donna.legal/, pp. 1-20.*

Web Archive of "RemarkableX : The fast solution for improving legal contracts," Remarkablex Website https://radiantlaw.com/lawtech/remarkablex dated Mar. 9, 2019, pp. 1-11.*

Hill, Caroline, "Radiant Law Enters the Software Business with Word Toolkit Remarkablex," Legal IT Insider, https://radiantlaw.com/lawtech/remarkablex dated Aug. 10, 2017, pp. 1-4.*

Internet Archive of "Welcome to the DEFT corpus," GitHub https://web.archive.org/web/20200919010812/https://github.com/adobe-research/deft_corpus, Sep. 19, 2022, pp. 1-5.*

Spala, Sasha et al., "DEFT: A corpus for definition extraction in free- and semi-structured text," In Proceedings of the 13th Linguis-

(56) References Cited

OTHER PUBLICATIONS tic Annotation Workshop, 2019, pp. 124-131, Association for Computational Linguistics, Florence, Italy.*
Extended European Search Report for related European Patent Application 20849210.8 dated Aug. 2, 2023, 8 pages.
Office Action from related Canadian Patent Application 3,146,606 issued Mar. 13, 2024, 6 pages.

* cited by examiner

CREDIT AGREEMENT

This CREDIT AGREEMENT (this "Agreement") entered into as of ——— among B———, Inc. (the "Lead Borrower"), ———, the Persons signatory hereto as borrowers and named on Schedule 1.01 hereto (collectively, together with the Lead Borrower and such Persons as may be joined as a borrower, the "Borrowers"), each lender party hereto (collectively, the "Lenders"), B———, as Administrative Agent, Collateral Agent and Swing Line Lender, J———, W———, and ———, as Co-Syndication Agents, and C— and R—, as Co-Documentation Agents.

The Borrowers requested that Lenders provide revolving credit facility, and the Lenders indicated their willingness to lend ———, in each case on the terms and conditions set forth herein.

In consideration of the mutual covenants and agreements herein contained, the parties hereto covenant and agree as follows:

ARTICLE I
DEFINITIONS AND ACCOUNTING TERMS

1.01 Defined Terms. As used in this Agreement, the following terms shall have the meanings set forth below.

'automated clearing house transfers.'

"Acquired Companies" means ———, a Delaware limited liability company, ———, a Delaware limited liability company, ———, Delaware limited liability company, ———

"Acquisition" means, with respect to any Person (a) the purchase of a Controlling interest in the Equity interests of any other Person, (b) a purchase or other acquisition of all or substantially all of the assets or properties of another Person or of any business unit or line of business of another Person (other than acquisitions or openings of new stores ———), (c) any Material Store Acquisition or (d) any merger or consolidation of such Person with any other person.

---

Agreement

Index Term:
"Agreement" means this Credit Agreement

Inline Definition:
This CREDIT AGREEMENT (this "agreement") is entered into as of August 3, 2015 among ENTITY1, INC., a delaware entity (the "Lead Borrower"), the Person s signatory hereto as borrower and named on Schedule 1.01 hereto (collectively, together with the Lead Borrower and such other Person s as may be joined as a borrower from time to time in accordance herewith, the "Borrowers"), each lender from time to time party hereto (collective, the "Lenders"), ENTITY2 as Administrative Agent

FIG. 5

DEFINITION RETRIEVAL AND DISPLAY

CROSS-REFERENCE TO RELATED APPLICATIONS

This application is a continuation of U.S. Non-Provisional patent application Ser. No. 16/932,498, filed 17 Jul. 2020, titled "DEFINITION RETRIEVAL AND DISPLAY." U.S. Non-Provisional patent application Ser. No. 16/932,498 claims the benefit of U.S. Provisional Patent Application 62/882,197, filed 2 Aug. 2019, titled "AUTOMATED DEFINITION PARSING AND DISPLAY FROM LEGAL DOCUMENTS." The entire content of each aforementioned patent filing is hereby incorporated by reference.

BACKGROUND

1. Field

The present disclosure relates generally to natural language processing and, more specifically, to named-entity recognition in legal documents.

2. Description of the Related Art

Analyzing unstructured natural language texts in various industries often relies on a detailed understanding of text terminology and their associated definitions. The time required to perform this analysis increased with the length of a body of text and the number of relationships the body of text has with other bodies of text. An increase in text length or the number of relations causes a resulting increase in the possibility of logical errors or misdefined terms appearing in the text, either with respect to itself or with respect to the terms used in related texts.

SUMMARY

The following is a non-exhaustive listing of some aspects of the present techniques. These and other aspects are described in the following disclosure.

Some aspects include a process including obtaining, with a computer system, from an application executing on the computer system, first text of a natural language text document displayed by the application, the application displaying at least part of the natural language text document in a first region of a display, and the first text being natural language text. The process may include detecting, with the computer system, a definitional statement in the first text with steps for detecting definitional statements, where the definitional statement is not labeled as such with formal language in the natural language text document. parsing, with the computer system, a defined term and a definition of the defined term from the definitional statement storing, with the computer system, the defined term and the definition in an entry in a dictionary data structure associated with the natural language text document and associating the entry with a location in the natural language text document of the definitional statement. The process may include detecting the defined term being used in another location in the natural language text document, the other location being outside of the definitional statement and, in response, causing: a visual indication to be presented in the first region of the display in association with the defined term being used in the other location, and the definitional statement or definition thereof to be displayed in a second region of the display concurrently with displaying both the defined term being used in the other location in the natural language text and the visual indication in the first region of the display.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 5 shows an analysis application executing concurrently with a text-displaying application, where the analysis application displays a set of definitions of a term, in accordance with some embodiments of the present techniques.

Figure 1:
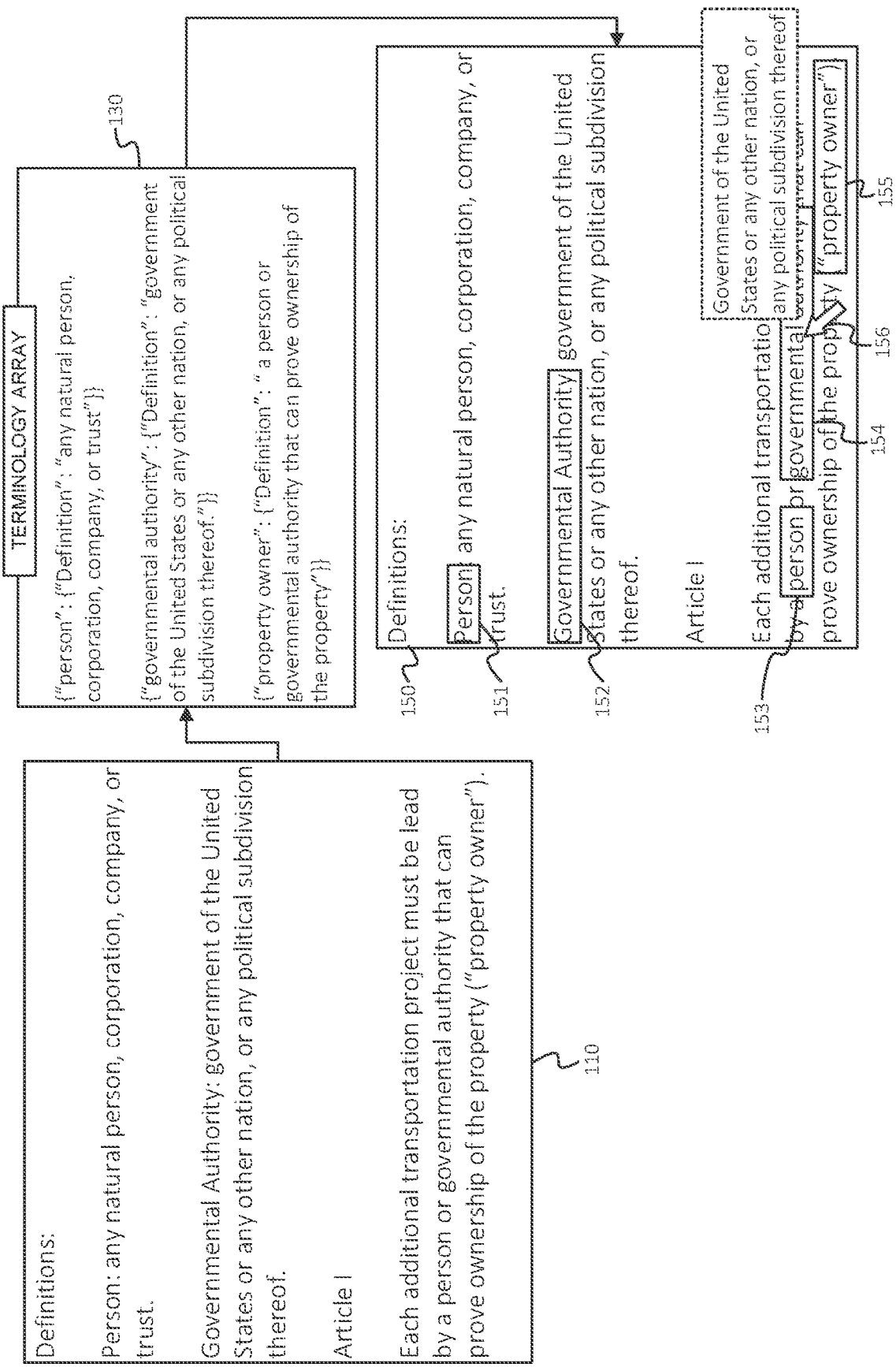
FIG. 1 displays screens representing user interface wireframes of an application to obtain terms and their associated definitions from a body of natural language text, in accordance with some embodiments of the present technique.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of natural language processing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Formal language theory divides the universe of possible languages into formal languages and natural languages. The former typically have relatively strict, well-defined grammars, and text in those languages typically exhibits relatively little ambiguity. Examples include programming languages and hierarchal data serialization formats (like JSON or XML). Parsing explicitly-labeled definitions from such documents are not particularly challenging to implement with a computer, and existing tools, like independent development environments for software developers, are often used for such purposes. Natural languages, in contrast, are typically used by humans to communicate with one another. Such languages often can express the same semantic content a variety of different ways and have relatively permissive grammatical rules. Natural languages often allow for ambiguity, and they are exceedingly difficult for computers to analyze when extracting definitions or, more generally, when performing text entailment in natural language processing (NLP).

To the extent NLP tooling exists for definition extraction or other forms of text entailment, those tools are not well suited for certain types of use cases for certain types of text, where references to "text" should be read as referring to natural language text, unless indicated otherwise. In certain fields, like in the practice of law, natural language text documents exhibit substantially more complexity than typical corpora, and the cognitive load or computational load placed on users or automated analysis systems by existing tooling may be excessive. In many cases, such NLP tools do not include a user interface (UI), or the UI is not integrated with a word processing application to facilitate rapid, low-effort navigation therebetween. Further, many types of NLP tooling fail to account for challenges particular to certain phases of a document's life-cycle. For example, tooling for document drafting often does not lend itself to document review or other types of analysis of an extant document, and users analyzing a finalized document may have different needs from users editing a document. A UI for the latter is often not ideal for the former, as a user analyzing an existing document is often much more sensitive to interruptions in the flow of reading a document. Interruptions, such as those often imparted by UIs that force the user to scroll or jump to another section of a document to view support for a detected definition or other forms of entailment, may dramatically increase the time to review and verify information stored in the document.

Some embodiments may determine a set of terms from a body of text. Some embodiments may then determine a set of context parameters for the set of terms, where the set of context parameters may be usable to determine a set of definitions for one or more terms. Some embodiments may then store the set of terms, their associated definitions, or a mapping between the set of definitions in a repository. The repository may be accessed by other instances of a text analysis application or text-displaying application for the display of a consistent set of terms, term definition, or data associated with the set of terms. By providing one or more of the features described in this disclosure, some embodiments may reduce the risk of incorrect or inconsistent definitions being associated with a term, reduce the cognitive load on a user when reviewing or drafting documents, or increase integration with digital agreement systems such as smart contracts executing on a distributed computing platform. That said, none of the preceding (or following) should be read as a disclaimer of any subject matter, as a variety of independently useful techniques are described, and some of those techniques may be deployed to address some issues without addressing other described problems with earlier approaches.

FIG. 1 displays screens representing user interface wireframes of an application to obtain terms and their associated definitions from a body of natural language text, in accordance with some embodiments of the present technique. The screen 110 shows a body of text and may be displayed as part of a UI of a text-displaying application. The body of text in the screen 110 includes terms (or other n-grams) and their associated definitions in the form of natural language text and also includes an inline term. In some embodiments, the body of text may be stored in a document, where the document may be a file in an operating system executing the text-displaying application or analysis application described in this disclosure. As used in this disclosure, use of the word "term" may include a character, a word, a set of words, or another n-gram, and may be associated with a definition, where some embodiments may generate a multidimensional mapping or graph to associate terms with one or more definitions.

In some embodiments, the body of text displayed in the screen 110 can be obtained from a first natural language text document being displayed by a first application (e.g., a text-display application) and stored in memory used by a second application (e.g., an analysis application). In some embodiments, an instance of an analysis application may be executed concurrently with an instance of a text-display application and displayed on a set of screens concurrently with the text-display application (e.g., as two windows on a screen). For example, an analysis application operating on a computing device may modify an instance of a natural language text document without modifying the text being displayed by the text-display application operating on the computing device in the screen 110. By storing a second instance of the text, modified and unmodified versions of the text may be concurrently stored in a same memory of the computing device and simultaneously displayed on a screen of the computing device. Alternatively, the analysis application may analyze or modify the same text document being displayed by the text-display application.

In some embodiments, an analysis application may be executed to obtain, such as by selecting from a document, a set of terms and definitions stored in a data structure or set of data structures that includes terms and their associated definitions from the body of text shown in the screen 110. The analysis application may analyze the text in the screen 110 to obtain a set of terms and corresponding definitions to generate a terminology array 130 using one or more operations further described in this disclosure. For example, some embodiments may select the words/phrases "person" and "governmental authority" in the first text body shown in the screen 110, include these words/phrases in a set of terms, and store the set of terms in the terminology array 130 based on these terms being the n-gram between set of newline characters and a colon character.

Some embodiments may apply more than one set of criteria to determine if an n-gram of a document is a term, where a term may be associated with an explicitly written definition in a document stored on an accessible data repository. For example, some embodiments may determine that an n-gram is a term if the n-gram is listed in a terminology section or if it is enclosed by two quotation marks. As used in this disclosure, a terminology section may be characterized as a section of text that is structured with a combination of whitespaces or text newlines, where text blocks in the terminology section are formatted to include a term and a definition for the term in a listed format. For example, a terminology section may include three text blocks, where each text block follows the structure of a displaying a term, a colon following the term, and a definition for the term such that a term "example term" having the definition "example definition for the term" may be written in the terminology section as "example term: example definition for the term."

In addition to selecting "person" and "governmental authority" for inclusion in the terminology section as a set of terms, some embodiments may select the term "property owner" shown in the screen 110 as a term for being enclosed by quotation characters and store the term in the terminology array 130. Similarly, some embodiments may determine an n-gram or set of n-grams is part of a definition based on different criteria. For example, some embodiments may determine that the phrase "any natural person, corporation, company, or trust" is the definition for "person" based on being in the terminology section after a colon. One or more of the same set of embodiments may also determine that the term "person or governmental authority that can prove ownership of the property" is a definition for "property owner" based on a set of regular expression rules or machine learning operations.

In some embodiments, the analysis application or results of the analysis application may be used to modify a display of the text body shown in the screen 110 to produce the wireframe of the UI shown in a screen 150. For example, some embodiments may search through the text body of the screen 110 to show visual markers that indicate terms, display term definitions, or term-related information in the screen 150. Such visual markers may include highlighting (represented by the boxes 151-155), changing font colors, changing formatting, tagging with an expandable element, or the like. Each of the colors of the highlighting in the analyzed text body shown in the screen 150 may be distinguished based on additional properties associated with the terms, definitions, or the like. For example, the highlighting color of the box 151 may be distinct from the highlighting color of the box 153 to indicate that the box 151 surrounds a term and that the box 153 surrounds a version of the term. In addition, some embodiments may modify the indication of terms to distinguish between terms defined in a specific section or terms defined using an inline definition format (e.g., terms defined in a text section or not explicitly defined in a terminology section of a text body). For example, some embodiments may highlight the term "Governmental Authority" highlighted by the box 152 in a pink color for being an index-defined term and highlight the term "property owner" highlighted by the box 155 in a red color for being an inline-defined term. Some embodiments may determine that the term "property owner" is an inline term in response to detecting that the term is surrounded by parentheses and quotation mark symbols.

In some embodiments, the definition of a term can be displayed in response to an interaction with a UI, where such as interactions may include a cursor hovering over the term, a cursor clicking on the term, a detected tap on the term (e.g., via a touchscreen), a voice-registered command to provide the definition of the term, or the like. In some cases, an interaction such as a click, hover, or tap may be associated with a term if the interaction is within ten pixels of a letter of the term or at a screen position between characters of the term. For example, in response to the detection of a cursor 156 hovering over the term "governmental authority," some embodiments may instantiate or display the definition of the term "governmental authority" in a temporary box text box 157 that may be de-instantiated once the cursor moved away from the term "governmental authority." Alternatively, or in addition, terms or their corresponding definition may be displayed or otherwise indicated by other means, such as by injecting content to be presented in a sidebar of the text-displaying application's UI window. For example, while not shown, a definition for the term "governmental authority" can be displayed in a sidebar being presented concurrently with the screen 150. For instance, some embodiments may inject an event handler mapped to a region of pixels in which terms are displayed, and that event handler may be responsive to an on-hover (or on-click, or on-touch) event, and in response to such an event, the UI may be updated to display the associated definition of the term to which the event handler is mapped.

Figure 2:
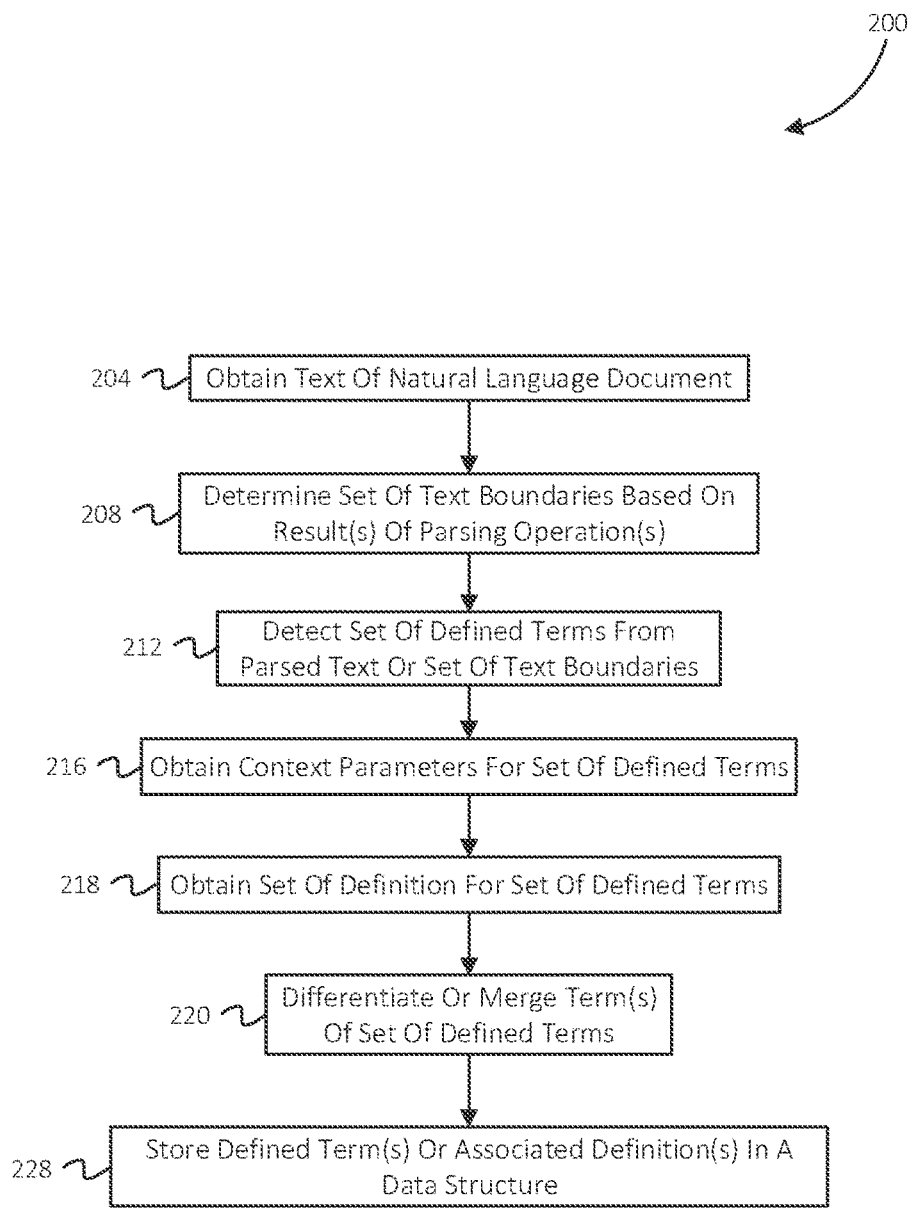
FIG. 2 is a flowchart illustrating a process to collect and store terms and corresponding definitions from natural language text, in accordance with some embodiments of the present techniques.
Figure 3:
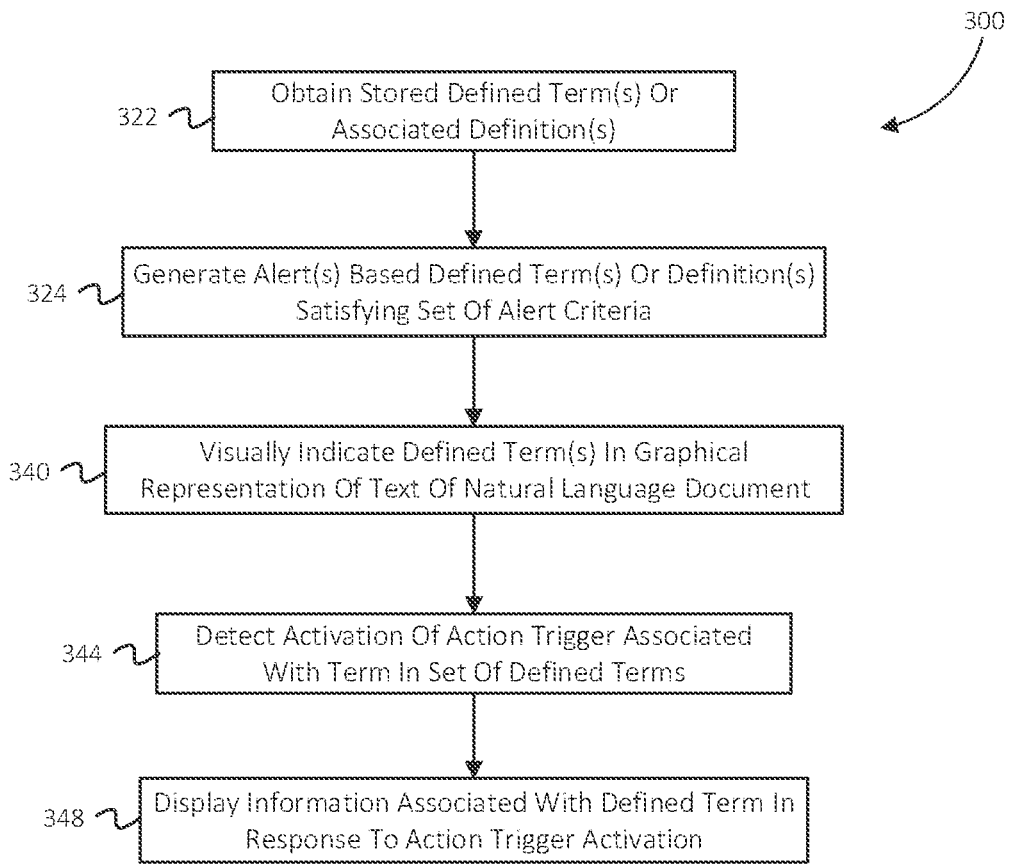
FIG. 3 is a flowchart illustrating a process to modify a visual display of text based on terms and their corresponding definitions stored in a collected repository, in accordance with some embodiments of the present techniques.

The processes of FIGS. 2-3 presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting. In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 2 is a flowchart illustrating a process to collect and store terms and corresponding definition from natural language text, in accordance with some embodiments of the present techniques. In some embodiments, the process 200 may include obtaining text of a natural language document, as indicated by block 204. In some embodiments, obtaining the text may include retrieving text data stored in a file, where the file may be or otherwise include data encoded in a character encoding format such as the 8-bit Unicode Transformation Format (UTF-8), another encoding based on the Unicode standard, or other character encoding standard. Example files may include document files having file extensions such as the ".txt," ".doc," ".rtf," ".docx,", ".htm," or the like. Alternatively, or in addition, some embodiments may obtain the text body from a set of files stored in a local drive, obtained over a local network, obtained over a distributed computing ledger, or obtained via the Internet. For example, some embodiments may obtain a text body from a web page containing images, videos, and text, where the text may be used as a text body.

Some embodiments may be written in a computer language that is supported by a text-displaying application via a set of built-in application program interfaces (APIs). For example, an application described in this disclosure may be written in JavaScript™ or Visual Basic™ for Applications (VBA), where the application may call one or more APIs of a text-displaying application such as Microsoft Word™ or Google Chrome™. Alternatively, or in addition, some embodiments may be written in other computer languages such as C #, C++, Python™, Ruby™ and the like. In some embodiments, an analysis application may use the API(s) of a text-displaying application to obtain a text body that is being displayed by an instance of the text-displaying application, where obtaining the text body may include accessing a stored record directly or modifying the stored record. For example, some embodiments may instantiate a second version of the text for analysis and manipulation in either persistent or non-persistent memory.

In some embodiments, the present techniques may be implemented as JavaScript™ code (or other ECMAScript compliant language) configured to interact with documents via the Microsoft™ Word JavaScript API (application program interface). In some embodiments, code implementing the present techniques may be just-in-time compiled and executed by a JavaScript™ engine (e.g., the V8 or Chakra or ChakraCore JavaScript™ engine) embedded in the text displaying application or the operating system in which the application runs. In some cases, such code may be parsed to an abstract syntax tree, which may then be transformed into a bytecode representation that is then compiled into machine code (e.g., native machine code of the computer executing the text viewing application, or machine code of a virtual machine). In some cases, such compiling may be performed on a different CPU core relative to a core concurrently executing the text displaying application to avoid impairing the viewing experience by consuming computing resources used to that end, which is not to suggest that all embodiments have this feature or that any other described feature is not also amenable to variation. Or in some cases, these JavaScript™ based techniques may be implemented with WebAssembly code.

Some embodiments may use a web application development framework to provide application functionality or to provide UI features. These development frameworks may include Vue, React, Angular, Flutter, or the like. In some embodiments, an analysis application used to select terms or definitions may be executed as an integrated add-on of a text-displaying application that operates concurrently with and uses at least one API of the text-displaying application. For example, the analysis application may be executed as an add-on application (e.g., a set of executable scripts) that runs concurrently or within the computing environment of a text-displaying application, where the text-displaying application may be executing as a host application for the analysis application. Host applications may include word processing applications (e.g., Microsoft Word™), PDF readers (e.g., Adobe Acrobat™), presentation applications (e.g., Microsoft Powerpoint™), web browsers (e.g., Google Chrome), online web platforms, or the like. Alternatively, or in addition, the analysis application may include a text-displaying application and may be instantiated without a host application or act as its own host application. In some embodiments, an analysis application may be executing independently of a corresponding text-displaying application displaying a same text body being processed by the analysis application, such that either of the two applications may be executed by a computing device without requiring concurrent execution of the other. In some embodiments, the analysis application may have access to a state variable(s) of a text-displaying application stored in program state, including access to a document being edited in such an application.

Alternatively, or in addition, some embodiments may convert text that is initially stored in an image into text encoded in a character encoding using one or more optical character recognition (OCR) operations. For example, some embodiments may perform OCR operations to convert an image into text encoded in UTF-8. By using OCR operations, some embodiments may be able to analyze text information that was not previously stored as text data, such as data provided from a scanning device, images of historical records, images captured with the use of a mobile computing device, or the like.

In some embodiments, one or more of the applications described in this disclosure, such as the text-display application or text analysis application, may be installed onto a computing device or virtual machine via an operating system-maker-curated online repository of applications. For example, some embodiments may be available through an online repository such as Microsoft Store™, Apple App Store™, or Google Play™. Alternatively, or in addition, some embodiments of the application may be installed onto a computing device or virtual machine via a sideloading installation method or via direct installation from a physical memory device or the Internet. Furthermore, some embodiments may be integrated as part of a word processing application or may be written in a native scripting language of such an application.

In some embodiments, the process 200 may include determining a set of text boundaries based on the result(s) of a set of parsing operations, as indicated by block 208. Various parsing operations may be used, where a parsing operation may include determining sections of text that may be distinguished from other sections of text based on one or more delimiters, where a delimiter may include a character, whitespace, a pattern of characters, a markup language tag, a word, a phrase, other types of n-grams, or the like. Some embodiments may parse text based on the use of a set of regular expressions ("regex"), where a regex may include a sequence of characters used define a search pattern and may be further described in Friedl (Friedl, Jeffrey E F. Mastering regular expressions. "O'Reilly Media, Inc.", 2006), which is hereby incorporated by reference. As further discussed in this disclosure, some embodiments may use regex patterns to detect a set of text boundaries, terms in the sections of set of text boundaries, term definitions, contexts used to better characterize the term or definition for the term, or the like. As further discussed below, some embodiments may perform determine text boundaries in multiple steps or repeat text boundary determination operations. For example, some embodiments may determine text boundaries before obtaining a set of context parameters, such as those determined using operations of block 216, and then revise or otherwise redetermine text boundaries after a set of context parameters obtained.

Some embodiments may determine a text boundary for a text section based on a white space arrangement, punctuation, specific keyword(s), list structure, enumeration, character formatting, text markup tags, or some combination thereof. For example, some embodiments may determine that a section of text is a terminology section based on a feature (e.g., single character, a pattern, or the like) of white spaces isolating the word "Definitions." By using a parsing operation to determine text boundaries for text sections, some embodiments may use a combination of keywords, spacing, newlines, or page breaks as delimiters to determine which analysis operations to apply for a set of text sections. In some embodiments, the combination of white spaces, keywords, list structures, enumeration, character formatting, markup tags, or the like used to distinguish different sections of text may be pre-determined. Alternatively, some embodiments may dynamically determine the delimiters between sections for use based on context or a determination of which spacing features are most common in a text body.

Some embodiments may parse the text into at an set of strings or characters and store the set in a non-persistent memory or persistent memory (e.g., solid-state memory storage). Some embodiments may import unformatted text via an API and parse the unformatted text, where formatting is stripped from the text. Alternatively, or in addition, some embodiments may import text with formatting, where the formatting may be represented in various forms, such as in tags compatible with the extensible markup language (XML) or encoded in other forms such as that of the rich text format (RTF). For example, some embodiments may import documents having XML tags indicating formatting. Various other formatting encodings may be used during parsing, where the formatting may be represented by using symbols/characters/strings that are compatible with a single file format or may be cross-compatible with multiple file formats.

In some embodiments, operations of the process 200 may include detecting a set of defined terms from the parsed text or the set of text boundaries, as indicated by block 212. In some embodiments, detecting the set of defined terms may include detecting a set of definitional statements, where a definitional statement may include a defined term and an associated definition for the defined term. As further discussed below, some embodiments may first determine a block of text as a definitional statement and parse the definitional statement to obtain the defined term of the definitional statement and an associated definition of the definitional statement. Alternatively, or in addition, some embodiments may detect a definitional statement by detecting a defined term of the definitional statement and then detecting the definitional statement of the defined term by determining the definition associated with the defined term. Using operations described in this disclosure, some embodiments may detect a definitional statement for complex cases, such as when the definitional statement is not labeled or otherwise indicated by formal language.

A term may include a word or phrase (e.g., n-grams with n less than or equal to 200, 100, 50, 25, 15, 10, 5, 4, 3, or 2). Some embodiments may determine that a word or phrase is a term based on a set of rules based on one or more regex searches, as described above. For example, some embodiments may use a first rule specifying that an n-gram is an term if it is in a terminology section, the first set of characters after a new line, and immediately followed by a colon or hyphen character. Alternatively, or in addition, some embodiments may use another rule specifying that an n-gram that is enclosed by parentheses and quotation marks is a term. For example, some embodiments may detect a definitional statement or an associated defined term using a regex command that detects an opening parentheses within less than 5 words of a close parentheses, less than 50 words of a close parentheses, less than 100 words of a close parentheses, or the like.

Some embodiments may obtain a set of defined terms from terms that are explicitly defined or otherwise indexed in a terminology section of the text, where the terminology section may be determined based on the text boundaries described above. For example, if a section enclosed by text boundaries is indicated to be terminology section and explicitly defines two terms "term0101" and "term0202," some embodiments may add both "term0101" and "term0202" to the set of terms. Alternatively, or in addition, as described above, a set of terms may include inline terms, where an inline term may be detected based on surrounding punctuation (e.g., surrounding quotation marks, surrounding parentheses, and the like), text formatting (e.g., underlining, bolding), particular words or phrases (e.g., "as used herein . . . "), other symbolic indicators, or the like. For example, some embodiments may use regex commands to add words or phrases between quotation marks or parentheses (e.g., adding 'Definition1' using regex commands based on the string '("Definition1")') to a set of defined terms having an associated set of definitions.

As further discussed in this disclosure, some embodiments may perform one or more machine learning operations to determine whether a set of words is a term, a definition for a term, or is otherwise related to a term. Some embodiments may perform a set of NLP operations that include a set of statistical operations or a set of machine learning operations to select a word(s) to include as a term of a set of terms. The set of NLP operations may include generating a set of embeddings for words, phrases, or sentences in a text body, where an embedding may include a numeric value, a vector, or the like. Some embodiments may generate a set of word embeddings using a neural network model such as a continuous-bag-of-words (CBOW) model, Skip-gram model, or character embedding, such as those described in Bhoir et al. (Bhoir, S., Ghorpade, T. and Mane, V., 2017, December. Comparative analysis of different word embedding models. In 2017 International Conference on Advances in Computing, Communication and Control (ICAC3) (pp. 1-4). IEEE). For example, some embodiments may perform a neural network-based word embedding operation such as an operation based on a Word2Vec model, which may use both the CBOW model and the Skip-gram model. Some embodiments may determine an embedding for a word using a model that is based on both the word itself and the context surrounding the word (e.g., syntax or semantics), such as Embeddings from Language Models (ELMo), as described by Peters et al. (Peters, M. E., Neumann, M., Iyyer, M., Gardner, M., Clark, C., Lee, K. and Zettlemoyer, L., 1802. Deep contextualized word representations. arXiv 2018. arXiv preprint arXiv: 1802.05365), which is hereby incorporated by reference. Some embodiments may determine embeddings from words using a trained transformer stack such as BERT (or other neural network-based transformer system) to generate a set of word embeddings, such as that described in Devlin et al. (Devlin, J., Chang, M. W., Lee, K. and Toutanova, K., 2018. Bert: Pre-training of deep bidirectional transformers for language understanding. arXiv preprint arXiv:1810.04805).

Some embodiments may apply a convolutional filter to text, where the convolutional kernel or the stride of the convolutional filter may be tuned. For example, some embodiments may apply a convolutional filter to text with a stride of one word and a kernel size of four words, where various other stride lengths or kernel sizes may be used. Some embodiments may use an attention model when detecting a definitional statement or its associated defined term or definition. For example, some embodiments may provide text in a document to a multi-headed attention-based autoencoder trained to map attention heads to definitional statements using a model similar to that described by Vaswani et al. (Vaswani, Ashish, Noam Shazeer, Niki Parmar, Jakob Uszkoreit, Llion Jones, Aidan N. Gomez, Lukasz Kaiser, and Illia Polosukhin. "Attention is all you need." In Advances in neural information processing systems, pp. 5998-6008. 2017, arXiv:1706.03762). Some embodiments may then further parse the definitional statement to determine a defined term or associated definition of the defined term. Alternatively, or in addition, some embodiments may then use one or more operations described above to directly detect the presence of a defined term or its associated definition.

Some embodiments may perform NLP operations that include training or using a neural network or another machine learning model to determine a term for inclusion in a set of terms. For example, some embodiments may train a neural network to determine which of a set of words are being defined. A neural network may include a convolutional neural network, recurrent neural network, long short-term memory neural network, gated-recurrent neural network, recursive neural network, some combination thereof (e.g., a recurrent convolutional neural network), or the like. Some embodiments may use a neural network or another machine learning model to determine the presence of a term that is not enclosed by defining symbols or characters. For example, some embodiments may generate word embeddings for the phrase "All mammals are characterized by being warm-blooded" and use a trained neural network to determine that "mammals" is a term that should be included in a set of terms.

Some embodiments may use one or more filters when obtaining terms from a text body. For example, some embodiments may apply a filter to remove terms from a set of terms unless the term is at least three characters long. Some embodiments may keep track of a text location for a term or otherwise include a process to add a text location for a term in the text relative to an objective text location, such as the start of the text. For example, some embodiments may assign the text location values [50, 185, 2063] to a first term to indicate that versions of the first term are present 50 characters away, 185 characters away, and 2063 characters away from the start of the text body. As further described in this disclosure, some embodiments may use these text locations to visually indicate a term, a definition for the term, or other sections of text related to the term. For example, as further described below, some embodiments may cause a text-displaying application displaying a text body to move a cursor to a highlighted term after the same term in a dictionary display is tapped or clicked on.

In some embodiments, the process 200 includes obtaining a set of context parameters for the set of terms, as indicated by block 216. A context for a term may be characterized by a set of context parameters, where a context parameter may include a word, a category, a numeric value, or the like. Some embodiments may analyze the surrounding text of a term to determine a context parameter associated with the term, where the context parameter for the term may be associated with a version of the term at a specified text location or be associated with all versions of the term in a document. For example, a first version of the term "mitigation system" may be associated with the first context parameter "computer network" to indicate that a sentence, paragraph, or other text section containing the first version of "mitigation system is associated with the category topic "computer network" by a topic analysis operation. Other context parameters may include a boolean or a number representing a proximity to a set of keywords or phrases (e.g., "in this section," "notwithstanding other instances," or the like). For example, some embodiments may include the value "3" and the key phrase "in this section" to indicate that a term is three words away from the phrase "in this section." In some embodiments, a context parameter may indicate a specified section of the term (e.g., an enumerated section, a category representing a definition section, or the like), or the like.

Some embodiments may perform a set of NLP operations to obtain a context parameter for a term. For example, the set of NLP operations may include applying a set of rule-based operations, such as those encoded in decision trees, decision tables, other decision structures, search algorithms, or the like. In some embodiments, the set of NLP operations may use on a pre-built vocabulary to retrieve one or more values. Some embodiments may use a rule-based regex command to identify one or more context parameters. For example, a context parameter may include determining a text location in a terminology section based on the text following a colon and ending with a period and line break. In some embodiments, obtaining the context parameter associated with a term may include directly inputting a parameter into a context array or other data structure component. In some embodiments, an analysis application may incorporate the surrounding text of a term into a context parameter associated with the term.

In some embodiments, a context parameter for a term may be determined based on a set of metadata tags associated with a file containing the term. For example, a text file may be associated with the metadata tags "high-performance computing" and, in response, some embodiments may include the parameter "filetag: high-performance computing" in the set of context parameters for a term or a plurality of terms found in the text file. Alternatively, or in addition, the tag may be obtained from values encoded in a file. For example, some embodiments may obtain a set of context parameters for a text body obtained from a web page based on web tags written into the generated source code of the web page.

In some embodiments, selecting what text to use as the surrounding text of a term for the purposes of determining a context parameter may include selecting text within a text boundary, such as a text boundary determined using operations described above for block 208. Some embodiments may determine that text within a set of text boundaries is part of the surrounding text for a term, and that text outside the set of text boundaries is not part of the context for a term. As described above, various features of a text body may be used to determine a text boundary, such as formatting, formatting changes, enumeration, whitespace spacing, font changes, boundaries of other defined sections, or the like. For example, some embodiments may determine the text boundary based on a text within a section that is bordered by definitions of other terms at a starting position and a bold numbering at an ending point. Some embodiments may then determine a set of n-grams within the text to determine noun or noun phrases of the text in order to determine a context for the first term. Alternatively, or in addition, some embodiments may select a surrounding text based on a character range or word range within a term's text location. For example, the surrounding text to be used to determine a first term's context may be set to include words that are within 199 words of the first term.

Some embodiments may determine a context parameter based on a lexical chain determined from the text boundary. A lexical chain may include a sequence of n-grams or embeddings that is analyzed to determine a topic score, where the topic score may be associated with a detected topic. For example, some embodiments may analyze text within a text boundary to determine a set of sentences or sequences of embeddings of sentences, where the analysis may include using a machine learning model, statistical model, or the like. Some embodiments may then determine a set of related sentences from the set of sentences by ranking each respective sentence by their respective topic scores for each of a respective set of topics and associating sentences that satisfy a topic score threshold for at one or more topics.

Some embodiments may determine a context parameter based on a set of word embeddings associated with the words of the text body. For example, some embodiments may determine word embeddings for each word in a text boundary. Some embodiments may then use a latent Dirichlet allocation (LDA) model or another statistical model such as a probabilistic latent semantic analysis (PLSA) to determine a set of topics and corresponding set of topic scores based on the set of word embeddings, where such models may be further described in Kakkonen et al. (Kakkonen, T., Myller, N., Sutinen, E. and Timonen, J., 2008. Comparison of dimension reduction methods for automated essay grading. Journal of Educational Technology & Society, 11(3), pp. 275-288), which is hereby incorporated by reference. In some embodiments, a topic or its corresponding topic score may be stored in association with a defined term or may otherwise be used in a set of context parameters associated with the defined term.

In some embodiments, the process 200 may include obtaining a set of definitions for the set of terms, as indicated by block 218. Some embodiments may obtain a definition associated with a term using a set of rule-based operations based on formatting, punctuation, whitespace, a set of context parameters, or the like. A regex pattern may be written to obtain definitions of terms based on the structure or format of a terminology section. Alternatively, or in addition, some embodiments may apply one or more machine learning operations to obtain a definition associated with a term, as further described below.

Some embodiments may apply different sets of rules or NLP operations to different sections of a text body. For example, some embodiments may use a first rule specifying that text satisfying the regex pattern "/:(.*?)\./" is a definition for a first text section categorized as a "terminology section," where the text boundaries defining the first text section uses operations similar to those described for block 212. Some embodiments may apply the first rule to obtain the definition "a human being" from the text "person: a human being" from the first section and not apply the first rule to a second section of the text body. Similarly, some embodiments may apply another set of operations (e.g., rules based on regex patterns, machine learning predictions, or the like) to a first section of a text body and not apply the same set of operations to another section of the text body.

In some embodiments, a definition associated with an inline term may be obtained based on rules specifying that a definition for the inline term is based on proximity, punctuation, or certain words or word types. For example, some embodiments may obtain the definition "owner of the property" from the text "owner of the property ('property owner')" for the inline term "property owner" based on a rule specifying that the definition for the term includes the sequence words starting with any of a first root word of a term and ending with a punctuation mark. Some embodiments may obtain the definition of a term based on a manual entry of the definition into a set of definitions.

Alternatively, or in addition, some embodiments may perform one or more NLP operations to identify definitions. In some embodiments, performing an NLP operation may include performing a set of machine learning operations such as generating, training, or otherwise using a neural network such as one or more of the neural networks described in this disclosure. For example, an NLP machine learning system may be trained to recognize a definition of an inline term using a training set that includes a set of paragraphs, a set of pre-determined inline terms, and a set of pre-determined definitions for the set of inline terms. As discussed above, words, phrases, or sentences of training text or other text may be first converted into a word embeddings using one or more embedding operations described in this disclosure.

In some embodiments, determining the definition may include determining a definition category of a plurality of definition categories, where the definition category may indicate the source of the definition, type of definition, or the like. Some embodiments may apply one or more various categories to a definition indicating an origin or type of the definition or a term associated with the definition. For example, some embodiments may obtain a definition from a section of text not categorized as a part of a terminology section that contains an inline term based on the section of text incorporating the inline term and associate the definition with a definition category having the label "inline definition" in response to the definition being contained outside of a terminology section. Similarly, some embodiments may label a definition as an "index definition" in response to the definition being contained in a section of text labeled as part of a terminology section. Some embodiments may then determine which definition is a dominant definition based on a programmed prioritization for an index definition, an inline definition, or other category of a definition. For example, some embodiments may prioritize index definitions over inline definitions and, in response, select the index definition as the dominant definition, where the dominant definition may be the definition that is first displayed after an interaction with an action trigger, as discussed further below.

In some embodiments, operations of the process 200 may include differentiating or merging terms of the set of defined terms, as indicated by block 220. Some embodiments may differentiate terms based differences in spelling, differences in definitions, differences in context, or the like. Alternatively, or in addition, some embodiments may merge defined terms based on similarities in spelling, similarities in definitions, or similarities in context. By applying operations to differentiate or merge terms, some embodiments may increase the usefulness of a set of defined terms by eliminating duplicative terms or definitions or reduce the risk of mislabeling, mis-defining, or misusing a term.

Some embodiments may differentiate defined terms using a set of parsing operations on a term. For example, some embodiments may parse a defined term based on one or more of a set of phrases, set of symbols, set of characters, set of spaces, or some combination thereof (e.g., a set of phrases and characters). For example, some embodiments may parse the defined term "receiving agent verifier" into the words "receiving," "agent," and "verifier" based on a whitespace character. Other delimiter elements may include quotation marks, apostrophes, dashes, commas, periods, or the like. The set of defined terms may also include the defined term "receiving agent," where some embodiments may parse the term into the words "receiving" and "agent." After processing, some embodiments may determine that "receiving agent identifier" is different from "receiving agent" based on different associated definitions or different context parameters associated with each respective term. Some embodiments may encounter a version of a first string "receiving agent" and perform a logical check of whether the word "identifier" follows the version of the first string. If so, some embodiments may retrieve the definition for the defined term "receiving agent identifier" instead of the defined term "receiving agent" for display in a UI after the version of the first string is tapped on or clicked on, as further described below.

In some embodiments, a defined term may be defined multiple times in a definition section or elsewhere within a text body. In some embodiments, the analysis application may merge definitions, such as by combining both definitions sequentially. For example, some embodiments may store a plurality of definitions associated with a same defined term and show some or all of the associated definitions upon activation of an action trigger, as described further below. In some embodiments, a set of context parameters corresponding to a version of the defined term may be used to determine which definition(s) to display. Some embodiments may select a most relevant definition for a version of a defined term based on one or more context parameters indicating a context surrounding the version of the defined term. For example, some embodiments may associate the term "XYZ act" with the first definition "performance made by performer XYZ" when the term "XYZ act" is present in text section associated with a first topic and may associate the second definition "performance of actions X, Y, or Z" with the term "XYZ act" when present in a text section associated with a second topic. Alternatively, or in addition, some embodiments may detect that one or more of the terms of a set of terms are duplicates based on similar definitions or identical definitions and, in response, delete one of duplicate terms or associated definitions.

In some embodiments, the process 200 may include storing the set of defined terms or their associated set of definitions in a data structure, as indicated by block 228. In some embodiments, the set of terms or their associated set of definitions may be stored in a centralized repository, such as a remote computing environment in communication with multiple computing devices. In some embodiments, the remote computing environment can include a cloud computing environment. For example, some embodiments may store a set of terms, their corresponding word embeddings, their associated definitions, or related information (e.g., neural network weights) on a cloud repository hosted by an Amazon AWS server, Microsoft Azure server, or the like. Alternatively, or in addition, some embodiments may host the set of terms, associated definitions, or the like on a distributed computing environment, such as a distributed file storage system. Some embodiments may store a term of the set of defined terms or an associated definition in an entry of a dictionary or another data structure, such as a hash table, Trie, relational database, or the like. In some embodiments, the entry may be associated with a location of a text document containing the defined term or associated definition. For example, some embodiments may determine a defined term and associated definition of a definitional statement of a text document and store the defined term in an entry of a dictionary structured as a relational database in association with the defined term, where a value of the entry of indicates a text location of the defined term in the text document.

In some embodiments, storing a defined term may include storing different versions of the defined term, where versions may include singular forms, plural forms, common misspellings, regional spelling variations, or the like. For example, the term "Radius" may be included in a set of defined terms and may be associated with a first definition. Some embodiments may then query a linguistic library to extract the plural forms of one or more words in the set of defined terms to associate the plural form of the defined term "Radii" with the same first definition. Some embodiments may then store these alternative forms in a centralized repository or distributed computing environment in association with the singular form of the defined term or the definition associated with the defined term. As discussed elsewhere in this disclosure, some embodiments may then detect the presence of the word "Radii," associate an action trigger with the word "Radii," and display the definition associated with the defined term "Radius" in response to an interaction with the action trigger.

In some embodiments, the centralized repository may include a site-wide or enterprise-wide computing environment that includes one or more on-site servers. In addition to storing terms and their associated definitions, some embodiments may store a set of values such as a set of numbers, range, list, set of categories, or other data included a term or definition or otherwise associated with the term or definition. For example, a payment amount may be extracted from a definition for a term and associated with the term, where the stored payment amount may be referenced by a second document that uses the term. In addition, a first term may be referenced by a second term in a first document, and this reference to the first term may be stored such that if the first term is not used in a definition of the second term in a second document, an alert may be generated. Some embodiments may store data in a relational database such as Oracle mySQL™ or PostgreSQL™. Alternatively, or in addition, some embodiments may store data in a non-relational or distributed database such as MongoDB™ or Apache Cassandra™. Some embodiments may use the relational or non-relational database to store a map or graph indicating relationships between terms, associated definitions, or associated data. For example, some embodiments may encode a series tables or arrays indicating a map or graph associating a same term with different definitions based on data related to specific versions of a term. By encoding specific data relating terms to different terms definitions based on context, some embodiments may increase the adaptability of a repository of terms to different use cases.

Some embodiments may store an association between the first document or a document type of the first document with a second document or document type. In some embodiments, the association may specify a related category or relationship between the first document or document type and the second document or document type. For example, the first document can include a "subservices" agreement, where the definitions of a "master services" agreement are applicable to the first document. Alternatively, or in addition, some embodiments may store an indicator that indicates the first document is a child document of the second document.

FIG. 3 is a flowchart illustrating a process to modify a visual display of text based on terms and their corresponding definition stored in a collected repository. In accordance with some embodiments of the present techniques. In some embodiments, the process 300 may include obtaining a stored set of defined terms or associated set of definitions, as indicated by block 322. Obtaining a stored set of terms or stored set of definitions may include retrieving data from a centralized repository, a local data storage, or the like. For example, some embodiments may obtain an array of terms from a mySQL database stored on persistent memory of an on-site server.

In some embodiments, the process 300 may include generating a set of alerts based on the set of defined terms or associated set of definitions satisfying a set of alert criteria, as indicated by block 324. Satisfying an alert criterion may include satisfying an error criterion, such as determining that a term is missing a definition, a term is defined multiple times, a definition is missing a specified punctuation character, or the like. The alert for a term may be generated as a metadata tag associated with a document, an entry in a record of a database associated with a term, or the like. In some embodiments, the alert may be displayed as a visual indicator, as further described in this disclosure.

In some embodiments, determining whether a term or a definition satisfies an alert criterion may include satisfying a criterion that an element of the definition exceeds a set of threshold values or threshold ranges. For example, a term may be defined as having a certain numerical value that exceeds a threshold range associated with the term, such as a range of percentages or a range of years. The threshold range may be stored in a cloud computing environment, an on-site server, a local memory, or the like, and may be obtained from a first file that is different than the numerical value that exceeds the threshold range. For example, some embodiments may obtain the threshold range from a leader natural language text document, where a follower document of the leader natural language text document is encoded as a second natural language text file and set to inherit terms of the leader natural language text document. Some embodiments may store a value representing this hierarchical association between the leader document and the text document to facilitate or otherwise indicate this type of term inheritance.

Some embodiments may detect the possibility or presence of a definition cycle between terms and generate an alert. A definition cycle may include a set of defined terms, where each of the respective definitions include or otherwise use other defined terms in the definition cycle. In some embodiments, a definition cycle between two defined terms may be detected using a set of conditional statements. For example, some embodiments may determine that a two-term definition cycle is present by detecting that a first term "category A" is defined as subcategory of a second term "category B" or otherwise may mention the term "category B." These embodiments may also detect that "category B" is defined as any category that includes "category A" or otherwise mentions the term "category B." In response, these embodiments may generate an alert indicating that a circular definition relationship may exist between "category A" and "category B."

Some embodiments may detect a definition cycle by generating a graph of defined terms and detecting cycles within the graph. For example, the generated graph may include a directed graph, where nodes of the directed graph may indicate defined terms. Furthermore, the directed edges pointing from a parent node to a child node of the directed graph may indicate that the definition of the defined term indicated by the parent node includes or otherwise uses the defined term indicated by a child node. Some embodiments may store graphs in one or more data structures, such as by storing nodes as objects and edges as pointers, by storing a matrix containing edges or edge weights between nodes represented by rows and columns of the matrix, by storing a list of arrays representing edges between enumerated nodes, or the like. It should be understood that the above indications made by a graph with respect to term and definition relationships are provided for illustrative purposes and should not be considered as limiting. For example, in some embodiments, an edge directed from a parent node to a child node may indicate that the definition of the defined term indicated by a child node includes or otherwise uses the defined term indicated by a parent node.

By using these operations, definition cycles of definitions greater than two may be captured. For example, if a first term is used in the definition a second term, and if the second term is used in the definition of a third term, and if the third term is used in the definition of the first term, some embodiments may generate a three-node, three-edge graph. Some embodiments may perform a search through the graph to detect the presence of one or more definition cycles using search algorithms such as a Depth First Search (DFS) algorithm, Breadth First Search (BFS) algorithm, other type of recursive or iterative graph traversal, or the like. For example, some embodiments may generate a directed graph and perform a set of depth first searches for each node to determine if a node is re-visited during one or more implementations of a DFS algorithm from a same starting node.

In some embodiments, the process 300 may include visually indicating the set of defined terms in a graphical representation of text of a natural language document, as indicated by block 340. In some embodiments, the graphical representation of the text may be displayed in a text-displaying application executing concurrently with an analysis application used to obtain terms or definitions. In some embodiments, the text-displaying application may be the same as the analysis application (e.g., the analysis application is a host application within which the text-displaying application). Alternatively, the text-displaying application and the analysis application may be separately-executing applications. In some embodiments, the locations of a set of terms may be stored and retrieved from a local memory. Alternatively, or in addition, the locations of the highlighted term may be stored and retrieved from a centralized repository. In some embodiments, the process may include identifying a definition for the term and displaying the definition in a screen region of a graphical display. In some embodiments, the analysis application may access the repository of terms and display a recommended definition.

Some embodiments may detect versions of the defined term being used in one or more other text locations in the natural language text document different from a first text location that was used to detect the defined term. For example, some embodiments may have first detected the presence a defined term at a text location "loc1" and stored the defined term in a dictionary data structure based on the version of the defined term and the associated definition in proximity of "loc1," where "loc1" may represent a numeric value indicating a text location. Some embodiments may then detect versions of the defined term at text locations "loc2," "loc3," and "loc4," where each of these text locations may represent numeric values indicating a text location. and, in response, cause a graphical display to display a visual indication of each version of the defined term at the other locations "loc2," "loc3," and "loc4."

In some embodiments, a visual representation of the terminology array ("terminology representation") can be displayed. For example, each of the terms in a terminology array stored on a centralized repository or local persistent memory may be displayed in a UI element. In addition, one or more definitions associated with a term may be displayed. Additionally, some embodiments may display terms or associated definitions of a source document while displaying a child document of the source document, where such source-child relationships between two documents may be indicated in a centralized repository or local persistent memory. As further described below, the term may also be displayed with a source document name in some embodiments, where the source document name can be different from a file name of the file storing the text. In some embodiments, terms that are detected but missing a dictionary definition may be highlighted and indicated in the visual representation of the terminology array. In addition, issues with dictionary definitions may be indicated, such as circular definitions or duplicate definitions.

In some embodiments, displayed definitions may be displayed in a UI element such as a sidebar, header, footer, or overlay box. For example, some embodiments may display a sidebar adjacent to or overlapping the text of a document being analyzed, where the sidebar includes terms or their associated definitions. In some cases, the UI of an application for displaying, editing, or analyzing text using one or more operations described in this disclosure may be implemented as a web document. For example, some embodiments may provide a UI for the first application by rendering HTML and executing JavaScript™ code to perform one or more operations described in this disclosure. Some embodiment may display a visual indicator of the defined term being used at a text location at a first region of the graphical displayed concurrently with a definitional statement or definition associated with a defined term at a second region of the graphical display. For example, some embodiments may highlight a version of a defined term in a document being displayed in a first region a graphical display (e.g., a first frame of text on a computer monitor screen) and display a definition associated with the defined term in a second region of the graphical display (e.g., a second frame of text on a computer monitor screen).

In some embodiments, a definition of a term may include other terms. In some embodiments, a UI element of an application displaying terms in a definition may modify a visual feature of the other terms to distinguish the other terms from other words in the definition. For example, some embodiments may display other terms in a definition such that the other terms displayed using different text formatting, using a different color, or the like. In some embodiments, an event handler may be mapped to a second term being used in a definition for a first term in a definition-displaying UI element, where the event handler may cause the UI element to present a definition of the second term upon activation. For example, some embodiments may allow a user to view a first definition of a first term in a first UI element while a second UI element is displaying a document. The user may then navigate to a second definition of a second term by tapping on the second term without changing a scroll position in the second UI element displaying the document.

In some embodiments, visually indicating a term in a graphical representation of the text body may include operations to programmatically format one or more terms. For example, some embodiments may perform a series of formatting operations using a first text body as input. Formatting operations may include adding formatting tags into the first text body, where the formatting tags may cause an application to display highlights, bolded text, italic text, change a font size, or the like, and where formatting tags may be edited using an API library associated with an application used to display text. For example, some embodiments may perform operations encoded in the JavaScript™ programming language to search through a Microsoft Word document and use Microsoft™ Word JavaScript™ API from the "WordApi 1.1" API library by using a Word function in a context "context1" to assign a selection with the code "context1.document.getSelection( )" and setting the selection to a color with the code "selection.font.highlightColor." Additionally, some embodiments may display alert messages in the form of comments, warning messages in a sidebar, or other visual indicators based on one or more alert indicators determined above. For example, some embodiments may determine that the term "term004" is associated with an alert indicator indicating a misdefined term and, in response, highlight in red all versions of the term "term004" appearing in a document.

In some embodiments, the process 300 may include detecting the activation of an action trigger associated with a term of the set of stored terms, as indicated by block 344. Activating the action trigger may include activating a UI element that is in physical proximity of a term, where the act of activation may include hovering over, clicking, tapping, or swiping a UI element containing the term or a spatial region near the term. For example, a user may click on a highlighted region of a term in a window or other UI element. Detecting that an action trigger of a term is activated may also include determining that an audio command specific to the term is received, where a microphone may convert the audio command into a computer-readable form.

In some embodiments, the process 300 may include displaying information associated with the defined term associated with the activated action trigger, as indicated by block 348. The information associated with a term may include a definition associated with the term, as described above. The information associated with a first term may also include an image, or a second term obtained from an enterprise-wide data server associated with the first term (e.g., as a synonym of the first term), file names of other documents using the first term, or the like. In some embodiments, activation of the action trigger may instead cause a cursor to move or a window to navigate to a different section of text. For example, after clicking on a term or a definition for the term in a UI window of analysis application, a concurrently-executing text-displaying application may navigate to a next location corresponding to a next version of the term in text as it is displayed by the text-displaying application.

In some cases, a term or its associated set of definition may span documents. For example, a master services agreement (MSA) may define various terms that are used in various statements of work that later extend upon the MSA. Some embodiments may be configured to associate and analyze various documents and display cross-document definitions with the techniques above. In some cases, documents may be so-grouped explicitly, by the user, e.g., by placing them in the same directory. Or some embodiments may parse references to other documents from a given document and, upon detecting such a reference, group the documents in response.

In some embodiments, the analysis application may implement a logical architecture that is expected to mitigate impacts to the user's experience with a host natural language text document ("host document") displayed by a host application, such as a host word processing application being used to display the host document. Some embodiments may interact with the document via, for example, the Word JavaScript™ API. In some embodiments, a cached copy of the host document may be provided by a word processing application to an analysis application or analysis subroutine that performs one or more operations described in this disclosure. In some cases, the analysis application may execute asynchronously relative to the process by which the user navigates through the host document, e.g., in a different thread or process, e.g., on a different core. As a result, spikes in computing load caused by analysis operations are expected to have a diminished to no effect on the responsiveness of the text-displaying or editing operations to user inputs like typing or scrolling. In some cases, the cached version may be updated with a synchronize operation requested by the analysis application. For example, some embodiments may update a cached version periodically or responsive to various UI events that the analysis application has registered to receive from the word processing application.

Some embodiments may obtain perform one or more operations of the process 200 or process 300 automatically, such as being executed in a recurring loop. Alternatively, or in addition, some embodiments may perform one or more operations of the process 200 or process 300 in response to an interaction with one or more UI elements, such as a button click, a click on a particular region of a screen, a swipe on a screen, or another user-initiated activity. Alternatively, or in addition, some embodiments may perform one or more operations of the process 200 or process 300 in response to a general input into the screen, such as performing one or more operations every one keystroke input, two keystroke inputs, or more keystroke inputs into a keyboard.

Figure 4:
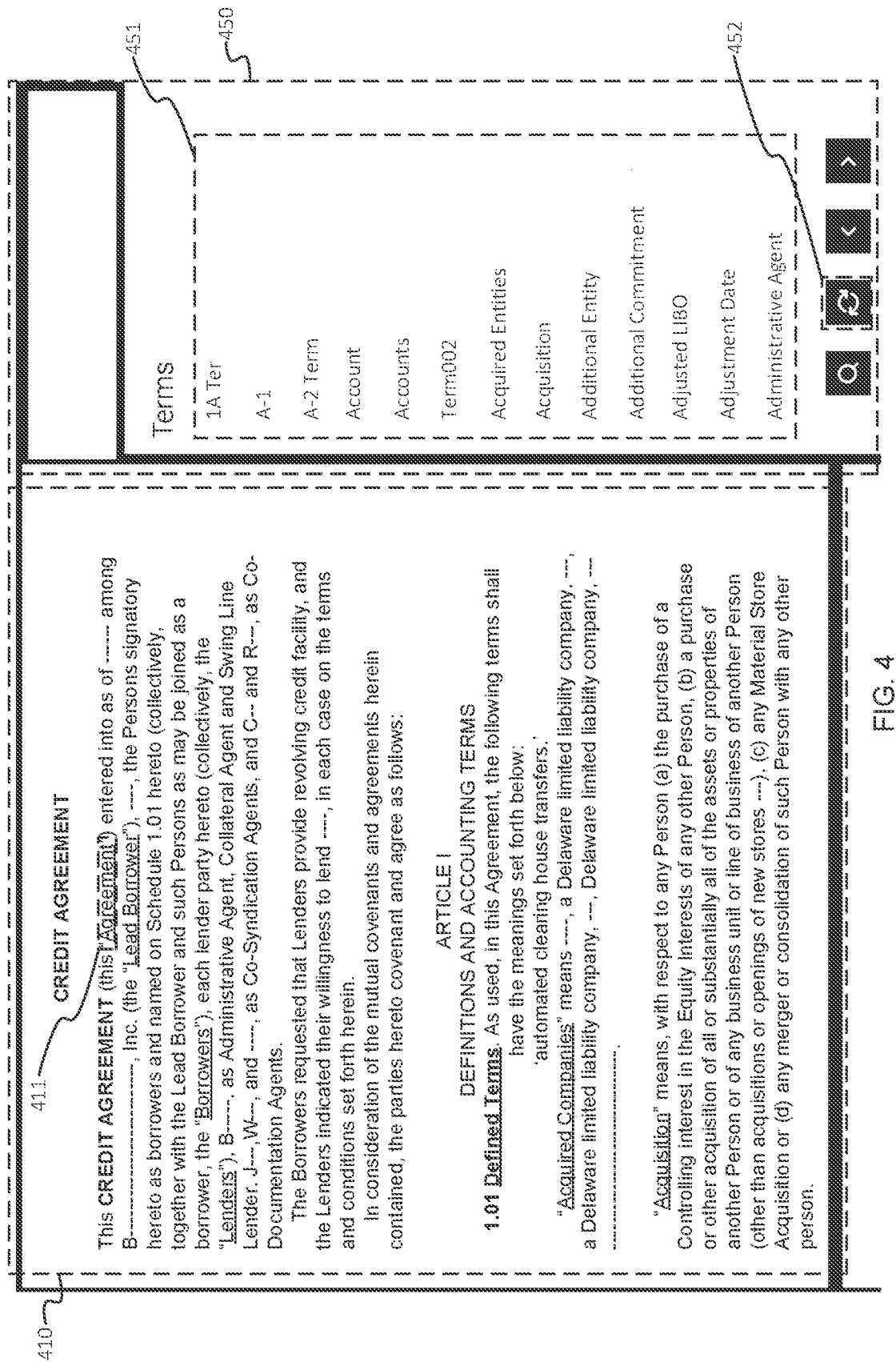
FIG. 4 shows an analysis application executing concurrently with a text-displaying application, where a user interface window of the analysis application displays a set of terms, in accordance with some embodiments of the present techniques.

FIG. 4 shows an analysis application executing concurrently with a text-displaying application, where a user interface window of the analysis application displays a set of terms, in accordance with some embodiments of the present techniques. A host application UI window 410 displays a body of text that includes the term "Agreement" as outlined by the box 411. An analysis application sidebar window 450 may be a UI element of the analysis application and displays a set of terms in the table 451. In some embodiments, the set of terms displayed in the table 451 can be populated using one or more of the operations discussed above for the process 200 or the process 300. In some embodiments, an interaction with the refresh button 452 may trigger a re-running of one or more operations of the process 200 or the process 300, which may cause the analysis application to obtain one or more terms or their associated definitions from the text body shown the host application UI window 410. As further described below, tapping or clicking on a term displayed in the table 451 may update the analysis application sidebar window 450 to display a definition of the term.

FIG. 5 shows an analysis application executing concurrently with a text-displaying application, where the analysis application displays a set of definition of a term, in accordance with some embodiments of the present techniques. Some embodiments may detect that the term "Agreement" as outlined by the box 411 in the host application UI window 410 was clicked on and, in response, update the analysis application sidebar window 450 to displays a first definition outlined by a box 561 and a second definition outlined by the box 562. The first definition outlined by the box 561 includes an indexed definition for the term "Agreement."

In some embodiments, the indexed definition may be obtained from a terminology section of the host document being displayed in the host application UI window 410, associated document stored in a centralized repository, distributed database, some combination thereof, or the like. The analysis application sidebar window 450 also shows an inline definition outlined by the box 562. The inline definition shown in the box 562 may be obtained using one or more operations described in this disclosure, such as one or more operations described for block 218. In some embodiments, clicking or tapping on other highlighted terms can direct the analysis application sidebar window 450 to show the definition of the clicked/tapped term. For example, clicking or tapping on the term "Person" outlined in the box 563 can result in the analysis application sidebar window 450 showing the definition of the term "person."

As described above, activating the refresh button 452 may cause a re-running of one or more operations of the process 200 or the process 300. In some embodiments, this may cause a definition to be updated by sending query to a centralized repository or local memory. For example, some embodiments may cause a computing device to send a request to a API of a cloud server to update a definition of the word "Agreement." If the definition of the word "Agreement" has been updated to a new definition in the cloud server, the cloud server may send the new definition to the computing device to be displayed in the analysis application sidebar window 450.

In some embodiments, the present techniques may be implemented entirely within a monolithic application executing on a user's computing device, like within Microsoft Word. Or in some cases, the present techniques may be implemented in a distributed application, like with a client-server model in which a text viewing application (like a text editing application) is stored and executed server-side and a user interacts with this document via a web browser, like with Google Docs™. In such cases, the present techniques may be all executed server side, client side, or in any combination that is suitable. For instance, displays may be achieved by sending instructions that cause a web-browser to render the corresponding display.

Figure 6:
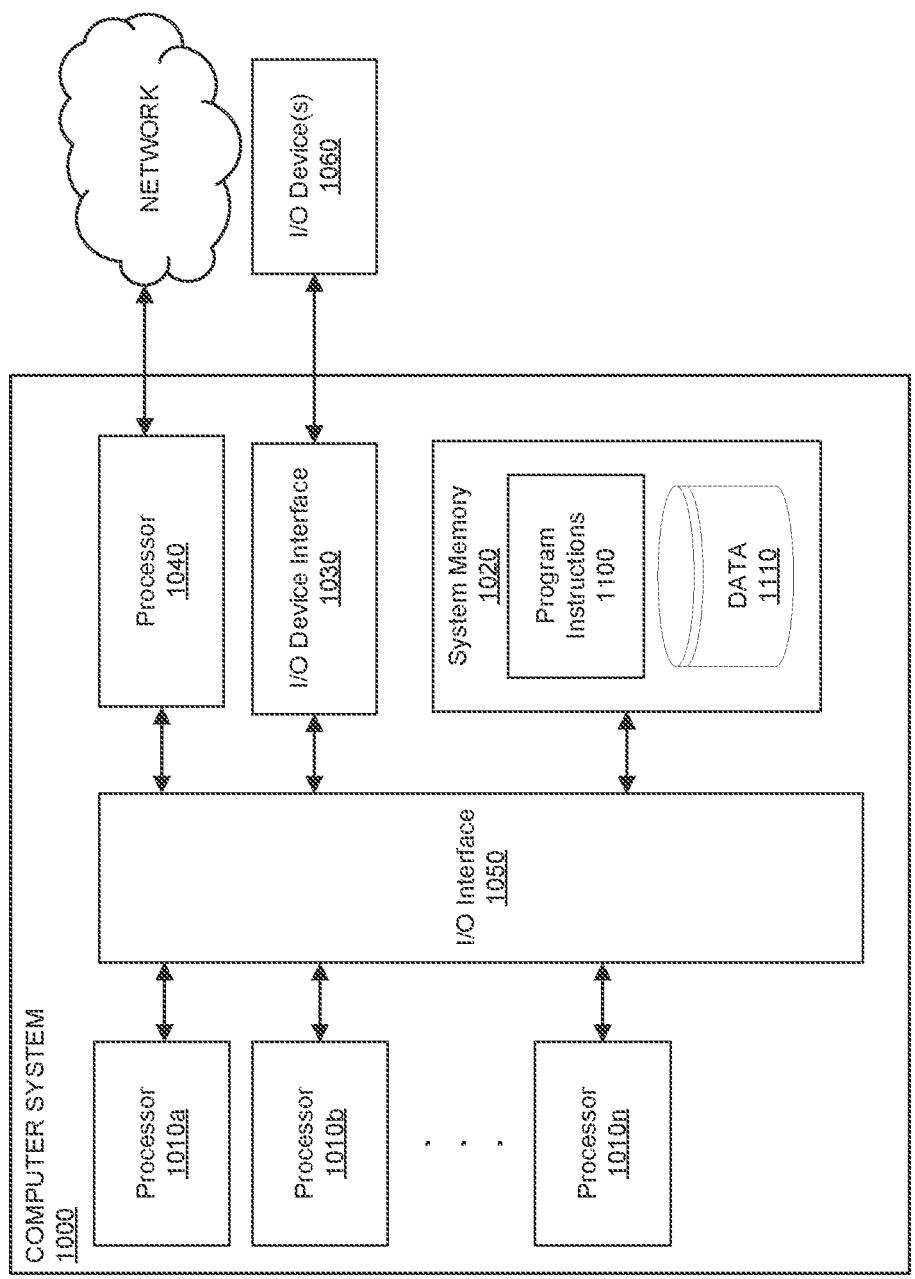
FIG. 6 shows an example of a computing device by which the present techniques may be implemented.

FIG. 6 shows an example of a computing device by which the present techniques may be implemented. FIG. 6 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

What is claimed is:

1. A tangible, non-transitory, machine-readable medium storing instructions that, when executed by a computer system, effectuate operations comprising:
   obtaining, with a computer system, from an application executing on the computer system, text of a first natural language text document displayed by the application, the text being natural language text;
   detecting, with the computer system, a definitional statement in the text, wherein the definitional statement is not labeled as such in the first natural language text document, wherein detecting the definitional statement comprises:
      causing at least some of the text of the first natural language text document to be input into a transformer model, wherein the transformer model is trained and is neural network-based, and wherein the transformer model has multi-headed attention;
      causing the transformer model to determine embedding vectors of segments of text in the first natural language text document, wherein the embedding vectors are based on context from at least some respective text adjacent the respective segments of text in the first natural language text document; and
      causing the transformer model to associate, based on at least some of the embedding vectors, terms in the document with text in the document defining those terms by applying the multi-headed attention to map attention heads of the transformer model to definitional text in the document;
   determining, with the computer system, a defined term and a definition of the defined term from the definitional statement;
   storing, with the computer system, a record associating the defined term with the definition;
   detecting the defined term being used in another location of the natural language text document; and
   after detecting the defined term being used in the other location, causing:
      a visual indication of the defined term to be presented in association with the defined term being used in the other location of the first natural language text document, and
      the definitional statement or definition to be presented, wherein:
         the operations further comprise caching a copy of the natural language text document;
         the application is used to display the natural language text document using a first thread; and
         detecting the definitional statement comprises detecting the defined term from the copy of the natural language text document using a second thread that is different from the first thread, the first and second threads being executed by the same computing device of the computing system.

2. The medium of claim 1, wherein:
   the operations further comprise storing an association between a singular form of the defined term and a plural form of the defined term, and wherein the defined term is first detected in the singular form; and
   detecting the defined term comprises detecting the plural form of the defined term being used in the other location in the natural language text document based on the stored association between the singular form of the defined term and the plural form of the defined term.

3. The medium of claim 1, wherein the application comprises a first application, and wherein detecting the defined term comprises detecting the defined term using an instance of a second application, wherein the instance of the second application is executed concurrently with the instance of the first application by the computer system.

4. The medium of claim 1, wherein storing the record associating the defined term with the definition comprises storing the defined term in association with a set of metadata tags, wherein the first natural language text document is labeled with the set of metadata tags.

5. The medium of claim 1, further comprising:
   determining a text boundary surrounding the defined term based on a set of formatting or spacing features of the text;

determining a first set of n-grams from a portion of the text of the first natural language text document within the text boundary of the defined term;

determining a lexical chain based on the first set of n-grams by determining a set of topic scores based on the first set of n-grams, wherein each respective topic score of the set of topic scores is assigned to a respective topic using lexical chaining, and wherein each respective score of the set of topic scores are stored in association with the defined term.

6. The medium of claim 1, wherein the defined term is a first defined term, and wherein the definition is a first definition, the operations further comprising:

determining a second defined term and a second definition corresponding to the second defined term;

generating a directed graph, wherein a first node of the directed graph is associated with a first defined term, and wherein a second node of the directed graph is associated with the second defined term;

determining whether the directed graph comprises a cycle; and in response to a determination that the directed graph comprises the cycle, generating an alert.

7. The medium of claim 1, wherein the application is being executed by a first computing device, and wherein storing the record associating the defined term with the definition comprises transmitting a message comprising the defined term to a data structure stored in a second computing device that is remote with respect to the first computing device.

8. The medium of claim 1, wherein the defined term is a first defined term, the operations further comprising:

determining a set of parameters based on a set of symbols, formatting changes, or other terms surrounding the first defined term;

determining whether a second defined term is present in a third portion of the text of the first natural language text document, wherein the third portion of the text of the first natural language text document is associated with a first parameter of the set of parameters; and in response to a determination that the second defined term is not present in the third portion of the text, generating an alert.

9. The medium of claim 1, the operations further comprising determining whether an action trigger was activated, wherein the action trigger is associated with the first term, and wherein the visual indication is presented in response to determining the action trigger was activated.

10. The medium of claim 1, the operations further comprising:

determining whether an action trigger was activated;

detecting that the defined term is present in a second natural language text document;

detecting a hierarchical association from the second natural language text document to the first natural language text document; and presenting the definition based on the hierarchical association.

11. The medium of claim 1, wherein:

detecting the definitional statement in the text is performed with an add-on application, via an application program interface to the application displaying the first natural language text document, the add-on application being executed by the second thread and the application displaying the first natural language text document being executed by the first thread.

12. The medium of claim 1, further comprising:

determining that the definition is associated with a first definition category, wherein the first definition category is one of a plurality of definition categories.

13. The medium of claim 12, wherein the definition is a first definition, the operations further comprising:

determining whether a second definition is associated with a corresponding defined term, wherein the second definition is associated with a second definition category different from the first definition category; and in response to a determination that the second definition is associated with the defined term, selecting the first definition as dominant based on the first definition category and the second definition category.

14. The medium of claim 1, the operations further comprising:

determining that a term lacks a definition and, in response, presenting an alert.

15. The medium of claim 1, the operations further comprising:

determining that a term is defined as having a numerical value, that the numerical value is outside a specified range, and in response, presenting an alert.

16. The medium of claim 1, the operations further comprising:

determining a set of word embeddings based on the text of the first natural language text document using a first neural network, wherein each respective embedding of the set of word embeddings comprises a respective vector;

determining a topic based on the set of word embeddings using a second neural network; and wherein storing the defined term comprises storing the defined term in association with the topic.

17. The medium of claim 1, wherein storing the definition comprises storing the definition in a relational database.

18. The medium of claim 1, further comprising steps for causing the definitional statement or definition thereof to be displayed.

19. The medium of claim 1, wherein the visual indication is presented automatically in response to detecting the defined term being used in the other location.

20. The medium of claim 1, wherein the definitional statement is detected in the first text with steps for detecting definitional statements.

21. The medium of claim 1, wherein:

detecting the defined term being used in the other location is performed by a text analysis application obtained from an operating system-maker-curated online repository of applications.

22. The medium of claim 1, wherein:

the definitional statement is displayed in a sidebar.

23. The medium of claim 1, wherein:

the definitional statement is displayed in a web document and the use of the defined term in the other location is indicated with changed formatting.

24. The medium of claim 1, the operations further comprising:

repeatedly updating the cached copy with a synchronize operation requested by the second thread to obtain a version used by the first thread; and concurrently analyzing current cached copies with the second thread and displaying the natural language text document with the first thread.

25. The medium of claim 1, wherein the operations comprise steps for determining context parameters.

26. The medium of claim 1, wherein determining the defined term and the definition comprises determining a plurality of candidate definitions and designating one of the candidate definitions as being most relevant.

27. The medium of claim 1, the operations further comprising steps for merging terms.

28. The medium of claim 1, the operations further comprising steps for reducing spikes in computing load caused by analysis operations.

29. The medium of claim 1, wherein the operations further comprise: causing the application or another application to display, concurrent with displaying the first natural language text document, a user interface element having inputs by which the user interacts with the stored record associating the defined term with the definition.

30. The medium of claim 1, wherein comprising associating terms in the document with text in the document defining those terms and mapping terms to locations in the natural language text document with the text defining those terms.

31. A method comprising:
 obtaining, with a computer system, from an application executing on the computer system, text of a first natural language text document displayed by the application, the text being natural language text;
 detecting, with the computer system, a definitional statement in the text, wherein the definitional statement is not labeled as such in the first natural language text document, wherein detecting the definitional statement comprises:
  causing at least some of the text of the first natural language text document to be input into a transformer model, wherein the transformer model is trained and is neural network-based, and wherein the transformer model has multi-headed attention;
  causing the transformer model to determine embedding vectors of segments of text in the first natural language text document, wherein the embedding vectors are based on context from at least some respective text adjacent the respective segments of text in the first natural language text document; and
  causing the transformer model to associate, based on at least some of the embedding vectors, terms in the document with text in the document defining those terms by applying the multi-headed attention to map attention heads of the transformer model to definitional text in the document;
 determining, with the computer system, a defined term and a definition of the defined term from the definitional statement;
 storing, with the computer system, a record associating the defined term with the definition;
 detecting the defined term being used in another location of the natural language text document; and
 after detecting the defined term being used in the other location, causing:
  a visual indication of the defined term to be presented in association with the defined term being used in the other location of the first natural language text document, and
  the definitional statement or definition to be presented, wherein:
   the method further comprises caching a copy of the natural language text document;
   the application is used to display the natural language text document using a first thread; and
   detecting the definitional statement comprises detecting the defined term from the copy of the natural language text document using a second thread that is different from the first thread, the first and second threads being executed by the same computing device of the computing system.

\* \* \* \* \*